United States Patent [19]

Stenzenberger

[11] 4,356,227
[45] * Oct. 26, 1982

[54] FIBER MATERIALS PREIMPREGNATED WITH DUROMERIC POLYIMIDE RESINS AND PROCESS FOR THEIR PREPARATION

[75] Inventor: Horst Stenzenberger, Schriesheim, Fed. Rep. of Germany

[73] Assignee: Technochemie GmbH, Dossenheim, Fed. Rep. of Germany

[*] Notice: The portion of the term of this patent subsequent to Jul. 8, 1997, has been disclaimed.

[21] Appl. No.: 202,655

[22] Filed: Oct. 31, 1980

[30] Foreign Application Priority Data

Oct. 31, 1979 [DE] Fed. Rep. of Germany ....... 2943964

[51] Int. Cl.$^3$ ............... C08G 73/12; B05D 3/02; B32B 7/00; B32B 27/34
[52] U.S. Cl. .................. 428/265; 427/385.5; 427/389.8; 427/389.9; 428/267; 428/268; 428/272; 428/273; 528/322
[58] Field of Search ............... 427/389.8, 385.5, 389.9; 528/322; 428/265, 267, 268, 272, 273

[56] References Cited

U.S. PATENT DOCUMENTS

3,669,930 6/1972 Asahara et al. ............... 528/322 X
4,211,861 7/1980 Stenzenberger ............... 528/322

FOREIGN PATENT DOCUMENTS

48-19867 6/1973 Japan ............... 427/389.8
55-27356 2/1980 Japan ............... 427/389.8

*Primary Examiner*—Michael R. Lusignan
*Attorney, Agent, or Firm*—Schwartz, Jeffery, Schwaab, Mack, Blumenthal & Koch

[57] ABSTRACT

A preimpregnated fibrous structural material is provided comprising a heat curable imide resin produced by reaction between an N,N'-bisimide of an unsaturated di-carboxylic acid and a hydrazide of an amino acid, and fibrous materials selected from the group consisting of carbon fibers, glass fibers and aromatic polyamide fibers impregnated with said imide resin.

7 Claims, No Drawings

FIBER MATERIALS PREIMPREGNATED WITH DUROMERIC POLYIMIDE RESINS AND PROCESS FOR THEIR PREPARATION

BACKGROUND OF THE INVENTION

1. Field of the Invention

The invention concerns fibrous materials which are preimpregnated with duromeric polyimide resins. More particularly, the invention concerns the so-called prepregs of fibrous materials and duromeric polyimide resins. The invention also concerns the process for the manufacture of such prepregs.

2. Background of the Prior Art

It is known that highly stable and thermally resistant composite materials can be prepared with duromeric polyimide resins. The duromeric polyimide resin is dissolved in a solvent and utilized as an impregnating lacquer for application to fibrous materials such as carbon fibers, glass fibers, boron fibers, organic, high modular fibers from aromatic polyamides, namely the so-called aramides. The fibers may be present in fibrous form per se, or in the form of webs, fabrics or fleeces. Following impregnation with the duromeric polyimide resin, the solvent is dried and a prepreg is formed wherein the resin provides a homogeneous carrier for the fibers. These prepregs can be pressed under pressure at high temperature into fibrous laminates which possess very good mechanical properites such as high tensile strength and high flexural strength when compared with the mechanical properties of the prospective high strength fibers.

Through the application of the duromeric polyimide resins, a higher mechanical thermal stability can be realized with good mechanical integrity of the compounds even at high temperatures.

Polyimides are known from French Pat. No. 1 555 564. These polyimides can be employed in the manufacture of fibrous laminates in which the web of glass fibers is impregnated with the solution of the resin in n-methylpyrrolidone in the conventional manner. The impregnated web is subsequently dried. Heat curable imide resins are known from German Published Application No. 27 54 632 as well as U.S. Pat. No. 4,211,861 granted July 8, 1980.

SUMMARY OF THE INVENTION

The methods of the prior art processes are improved upon in the instant invention by the surprising discovery that specific molar ratios of N,N'-bisimides and amino acid hydrazides and specific solvents may be utilized to produce prepregs and final products having superior mechanical properties.

The heat curable imide resins are prepared by reacting an N,N'-bisimide of an unsaturated dicarboxylic acid having the formula I

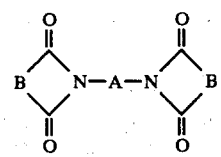

(I)

in which B is a divalent group containing a carbon-carbon double bond and A is a divalent group with at least two carbon atoms with a hydrazide of an amino acid according to the formula II

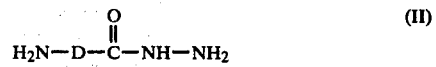

(II)

wherein D is a divalent group.

In the general formula I, A can be an alkyl group with up to 12 carbon atoms, a cycloalkyl group with 5 to 6 carbon atoms, a heterocyclic group with 4 to 5 carbon atoms and at least 1 nitrogen, oxygen or sulfur atom in the ring, a mono- or dicarbocyclic group or two mono- or dicyclic aromatic or cycloalkylene groups which are joined to one another through a direct carbon-carbon bond, or through a divalent lignin, namely oxygen, sulfur or alkylene group with 1 to 3 carbon atoms or a group selected from the following

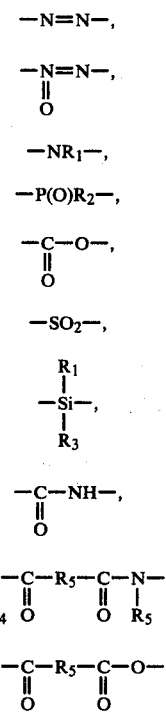

wherein the $R_1$, $R_2$, $R_3$, $R_4$, $R_5$ are alkyl groups with 1 to 5 carbon atoms.

The group B of the general formula I comprises a divalent organic group containing an ethylenically double bond. The following structures are possible for Group B:

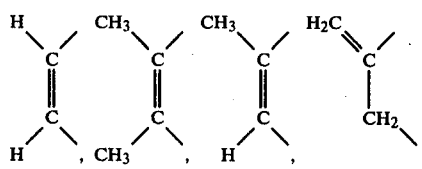

Suitable bisimides for the production of these imide resins are 1,2-bismaleimidoethane, 1,6-bismaleimidohexane, 1,12-bismaleimidododecane, 1,6-bismaleimido(2,2,4-trimethyl)-hexane, 1,3-bismaleimidobenzene, 1,4-bismaleimidobenzene,4,4'-bismaleimidodiphenyl ether, 4,4'-bismaleimidodiphenylsulfide, 4,4'-bismaleimidodiphenylsulfone, 4,4'-bismaleimido-dicyclohexylmethane, 2,4-bismaleimido-toluene, 2,6-bismaleimido-toluene, N,N'-m-xylenebismaleimide, N,N'-p-xylene-bismaleimide, N,N'-m-phenylene-biscitriconimide, N,N'-4,4'-diphenylmethane-biscitriconimide, N,N'-4,4'-diphenylmethanebisitaconimide.

For the process according to the present invention, the use of imide resin can also include a mixture of two or more of the above-named bisimides.

Examples of the amino acid hydrazide are the hydrazides of the following amino acids: amino acetic acid, alanine, leucine, isoleucine, phenylalanine, valine, β-alanine, γ-aminobutyric acid, α-aminobutyric acid, γ-aminocapronic acid, aminovaleric acid, and aromatic amino acids such as p-aminobenzoic acid, m-aminobenzoic acid, anthranilic acid which may be substituted through the alkyl group according to the following general formula (III)

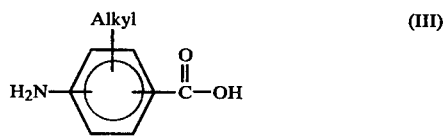

or amino acids of the diphenyl type with the following general formula (IV)

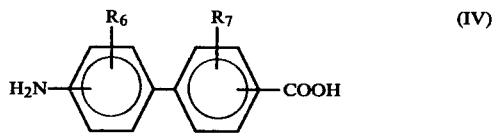

wherein $R_6$ and $R_7$ are hydrogen or methyl group, or a multiple center aromatic amino acid of the following general formula (V)

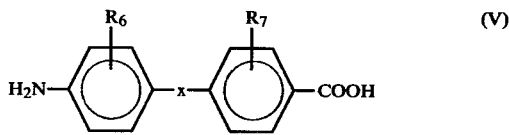

wherein x is

—O—

—S—

—SO$_2$— or

—CH$_2$— or amino acids of the naphthalene-type according to the following formula VI

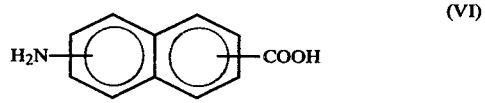

The preparation of the prepregs is accomplished from a solution of dimethylformamide, dimethylacetamide, N-methylpyrrolidone, tetramethylurea or mixtures thereof.

These highly polar, high boiling solvents are believed to be necessary because of their good solution properties for the above-mentioned polyimide resins of French Pat. No. 1 555 564. In spite of this, these solvents are not advantageous for the several reasons which follow.

As the result of high boiling points and excellent affinity for the polyimide resins, the above-mentioned solvents cannot be removed completely from the prepregs by drying even at elevated temperatures. Following the pressing of prepregs of this type into laminates under pressure and at hardening temperatures of 170°–250° C., the multilayer molded materials with a certain residual solvent content around 3% are obtained. This residual solvent disadvantageously has the function of a plasticizer and at high temperatures effects a deterioration of mechanical properties.

The invention is further based on the discovery that resins such as those disclosed in West German Offenlegungsschrift No. 27 54 632 and U.S. Pat. No. 4,211,861 may be processed to prepregs from a series of solvents. By virtue of their high volatility and low affinity with the resins, the solvents may be easily removed from the prepregs and thus are not present in the final hardened laminate. These laminates, free of plasticizing residual solvents, make it possible to utilize the high temperature properties inherent in the resins. Stated another way, the decline of the mechanical properties of the laminates to temperatures of 250° C. is slight.

Solvents used according to the present invention include acetic acid esters, preferably ethyl acetate, tetrahydrofuran, dioxane, ethylene glycol-diethylether, ethylene glycol-dimethylether, diethylen glycoldiethylether, diethylene glycol-dimethylether, diethylene glycol-monoethylether, diethyleneglycol-monoethylether or mixtures of these solvents with each other or mixtures with aromatic hydrocarbons, such as benzene, toluene or xylene or with ketone solvents, such as acetone, methylethylketone or the like.

The above-mentioned solvents are readily removed from the prepregs by drying, even though some of the solvents have high boiling points in excess of 150° C. It is not necessary for removal of the solvents to increase the drying temperature of the prepregs over the boiling point of the solvent used. It is nonetheless possible to remove residual solvents that remain in hardened laminates (due to unfavorable production conditions) by means of diffusion during tempering. In this manner, laminates are obtained with the mechanical properties thereof declining only slightly even at temperatures around 250° C.

For the preparation of prepregs by means of the above-mentioned solvents, the resins themselves are preferably produced in the same solvent. This procedure eliminates the isolation of the pure resin.

In the examples to follow hereinabove, typical process modes are presented in detail. Modification, arbitrary multiplications of the charges and the suitable adaptation of the process to industrial installations are readily effected.

EXAMPLE 1

358 g 4,4'-bismaleinimidodiphenylmethane and 45 g m-aminobenzoic acid hydrazide are introduced into a 1.5 liter round-bottomed flask equipped with an agitator and reflux condenser. To the initial charge, 200 g dioxane and 200 g diethylene glycol-monoethylether are added and the mixture heated under agitation to a temperature of 90°–100° C. A thin, low viscosity solution is obtained after about 10 minutes. The solution is maintained for one additional hour at this temperature for prepolymerization and is subsequently cooled to 40° C. The solution has a kinematic viscosity of 195 centistokes.

The solution, which has a solids content of 50% by weight, is used for the preparation of glass fabric prepregs. A glass fabric of Type 92111/A 1100, Interglas Co., Ulm, is coated homogeneously with the resin solution by means of immersion. Any excess solution is drained off by suspending the pieces of the fabric. Subsequently, the solvent is evaporated by drying in a circulating air cabinet, preferably at a temperature of 120° C. After drying for 20–25 minutes at 120° C., glass fabric prepregs with a resin content of 38% and a residual solvent component of 2.5% are obtained. The prepregs are suitable in this condition for the preparation of laminates by the low pressure autoclave process. In accordance with conventional technology a stack of prepregs, consisting of 18 layers is positioned by using separation fabrics and suction fabrics and hardened in the autoclave at a pressure of 7 atm and a vacuum of 150 Torr in a plastic bag, by heating at a rate of 3° C./min to 175° C. Pressure is applied after the temperature had been held at 175° C. for 10–20 minutes. The hardening is then effected at 210° C. for 3 hours. After removal from the mold, the laminate is tempered for 15 hours at 250° C. The laminate has the following mechanical properties:

Fiber content—60% by volume
Density—2.02% g/cm$^3$
Flexural strength at room temperature—580 N/mm$^2$
Flexural strength at 250° C.—400 N/mm$^2$
Flexural modulus at room temperature—2450 N/mm$^2$
Flexural modulus at 250° C.—2380 N/mm$^2$
Interlaminar shear strength at room temperature—45 N/mm$^2$
Interlaminar shear strength at 250° C.—35 N/mm$^2$

EXAMPLE 2

Comparative Example

This example is intended to show the effect of the solvents used in the preparation of prepregs on the temperature of fiber laminates pressed at low pressures of 70 N/cm$^2$. Here, a resin such as that disclosed in West German Offenlegungsschrift 27 54 632 and U.S. Pat. No. 4,211,861, is processed into uni-directional carbon fiber prepregs from a dioxanediethyl glycoldiethylether mixture. The disclosure of U.S. Pat. No. 4,211,861 is incorporated herein especially with respect to the preparation of the polyimide resins and prepregs. This resin is compared with a resin such as that disclosed in French Pat. No. 1,555,564, processed from N-methylpyrrolidone to prepregs by preparing prepregs and then laminates with both of the resins and comparing their properties at high temperatures.

(A) A mixture of 224 g 4,4'-bismaleinimidodiphenylmethane, 96 g of 2,4-bismaleinimidotoluene, 40 g 2,2,4-trimethylhexamethylenebismaleinimide and 20 g m-aminobenzoic acid hydrazide is dissolved in a dioxane-diethylglycolether mixture to form a solution of 55% by weight. The impregnating solution obtained is used to impregnate carbon fibers of Type Sigrafil-HF of the Sigri Co., Meitingen, West Germany. A non-directional carbon fiber fabric is prepared by the winding process and adjusted to a solvent content of 3–5% by drying at 80° to 90° C. The fabric is subsequently rolled into a prepreg with a thickness of 0.125 mm on a heated laminating table between silicone separating papers. Using the autoclave technique described in Example 1, a non-directional carbon fiber laminate is prepared. The laminate, tempered at 250° C. for 12 hours has the properties compiled in Table 1.

(B) As a comparison, a unidirectional carbon fiber laminate was prepared by means of the low pressure autoclave process, using the resin described in Example 4 of French Pat. No. 1,555,564.

78.4 g N,N'-bismaleinimidodiphenylmethane and 21.7 g of 4,4'-diaminodiphenylmethane are heated in a homogeneous mixture to 130° C. in 30 minutes and then ground. 93.1 g of the product are dissolved in 106.1 g N-methylpyrrolidone. The solution is used to prepare unidirectional carbon fiber matting produced by the winding method. The fibers used are of the Sigrafil-HT type used in (A). Excess solvents are removed by drying at 60° C. in a partial vacuum. The carbon fiber prepregs obtained in this manner are pressed in a vacuum bag by the low pressure autoclave technique into a unidirectional carbon fiber laminate. The residual solvent content is 3.5–5%.

The pressing process is effected as follows: prepreg pieces of 150×100 mm are stacked in the form of a prepreg laminate (18 layers) and positioned between separating and suction fabrics in a vacuum bag. The prepreg laminate is heated in a vacuum in 70 minutes to 140° C., followed by the application of a pressure of 65 N/cm$^2$. It is then heated to 180° C. and hardened for 2 hours at 180° C. Following cooling to room temperature, the laminate is removed from the mold and tempered for 15 hours at 250° C. Mechanical properties are compiled in Table 1.

| Property | Unit | Temperature °C. | Value Measured for the Laminate from Example | |
|---|---|---|---|---|
| | | | 2A | 2B |
| Fiber Content | Volume % | 25 | 60 | 60 |
| Density | g/cm$^3$ | 25 | 1.62 | 1.54 |
| Flexural Strength | N/mm$^2$ | 25 | 1065 | 1583 |
| | | 250 | 1372 | 477 |
| Flexural Modulus | KN/mm$^2$ | 25 | 128.6 | 125.3 |
| | | 250 | 130.7 | 91.2 |
| Interlaminar Shear Strength | N/mm$^2$ | 25 | 82.2 | 58.6 |
| | | 250 | 58.9 | 15.6 |

EXAMPLE 3

358 g N,N'-bismaleinimidodiphenylmethane and 50 g m-aminobenzoic acid hydrazide are heated in 500 ml of a mixture of toluene and ethanol (1:1) for 60 minutes with reflux. Subsequently, the solvent is evaporated and the residue, which is highly viscous at 100° C. is dissolved in a (70:30) mixture of dioxane-diethyleneglycol ether to form a low viscosity impregnating solution at 80°–100° C. The solution, which is stable at room temperature, is used to impregnate glass fabrics of Type US Style 181 (weight by unit area 295–300 g/m$^2$). Cut sections of the glass fabric (15×15 cm) are impregnated by immersion, suspended vertically and the excess resin solution drained off. They are subsequently dried in a circulating air drying cabinet at 140° C. for 10 minutes. Prepregs with the following properties are obtained:

Fiber Content—60%

Resin Content—36%
Volatiles—4%
Weight by unit area—490–500 g/m²
Flow—19.5% at 150° C. and 70 N/cm²

EXAMPLE 4

35 kg N,N'-bismaleinimidedodiphenylmethane, 15 kg 2,4-bismaleinimido-toluene and 6.9 kg m-aminobenzoic acid hydrazide are dissolved in an agitated vessel at 100° C. in 2 hours in the presence of dioxane-diethyleneglycol-monoethylether to a low viscosity, 45% solution by heating. In an impregnating tank heated to 40° C., the resin solution is used to impregnate a sheet of glass fabric with a width of 1 m. By means of idler pulleys and transport rolls, the glass fabric having a weight per unit area of 300 g is guided though the impregnating bath with the polyimide solution. Immediately following the impregnating bath, the fabric sheet is transported vertically into a heated, 6 m high drying tower. The excess resin drains back into the impregnating bath and the fabric, uniformly impregnated with the resin solution is passed through the heated tower for drying at a velocity of 1–1.2 m/min. The maximum temperature in the tower is 170° C. The dry prepregs leaving the tower have the following properties:

Resin Content—38%
Fiber Content—58%
Weight per unit area—478–490 g/m²
Residual solvent—4%

What is claimed is:

1. A preimpregnated fibrous structural material from a duromeric polyimide resin comprising
   (a) a heat curable imide resin produced by reaction between an N,N'-bisimide of an unsaturated dicarboxylic acid of the general formula I

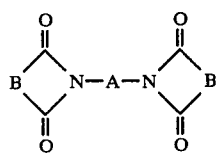

wherein A is a divalent organic group having at least two carbon atoms and B is a divalent organic group selected from the group consisting of

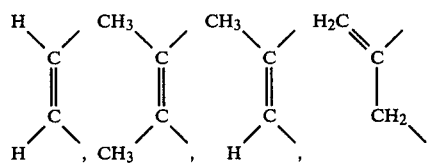

and a hydrazide of an amino acid of the general formula II

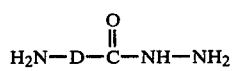

wherein D is a divalent organic group in a molar ratio of moles of N,N'-bisimide (I) to moles of aminobenzoic acid hydrazide (II) of between 1:1 and 10 and,
   (b) fibrous materials selected from the group consisting of carbon fibers, glass fibers and aromatic polyamide fibers in the form of unidirectional mat or fabric, said fibrous materials impregnated with said imide resin.

2. The preimpregnated fibrous structural material of claim 1 wherein the bisimide is selected from the group consisting of 1,2-bismaleimidoethane, 1,6-bismaleimidohexane, 1,12-bismaleimidododecane, 1,6-bismaleimido-(2,2,4-trimethyl)-hexane, 1,3-bismaleimidobenzene, 1,4-bismaleimidobenzene, 4,4'-bismaleimidodiphenylmethane, 4,4'-bismaleimidodiphenylether, 4,4'-bismaleimidodiphenylsulfide, 4,4'-bismaleimidodiphenylsulfone, 4,4'-bismaleimidodicyclohexylmethane, 2,4-bismaleimido-toluene, 2,6-bismaleimido-toluene, N,N'-m-xylenebismaleimide, N,N'-p-xylene-bismaleimide, N,N'-m-phenylene-biscitriconimide, N,N'-4,4'-diphenyl methane-biscitroconimide and N,N'-4,4'-diphenylmethanebisitaconimide.

3. The preimpregnated fibrous structural material of claim 1 wherein the bisimide of the general formula I

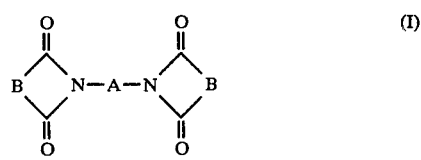

is reacted with a hydrazide formed from an amino acid selected from the group consisting of amino acetic acid, alanine, leucine, isoleucine, phenylalanine, valine, β-alanine, γ-aminobutyric acid, α-aminobutyric acid, γ-aminocapronic acid, aminovaleric acid, and aromatic amino acids selected from the group consisting of p-aminobenzoic acid, m-aminobenzoic acid, anthranilic acid, anthranilic acid substituted through the alkyl group according to the following general formula III

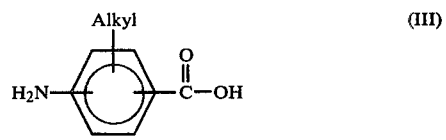

and diphenyl amino acids according to the general formula IV

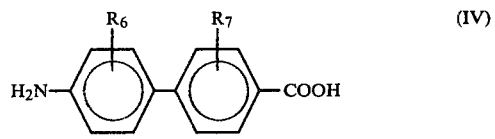

wherein the $R_6$ and $R_7$ groups are hydrogen or methyl groups and a multiring aromatic amino acids according to the general formula V

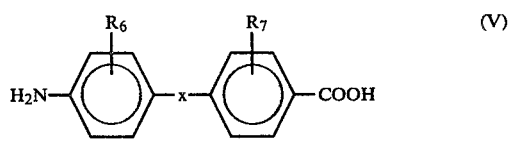

wherein x is —O—, —S—, —SO₂— or —CH₂— and amino acids of the naphthalene-type according to the following formula VI

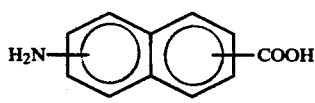

(VI)

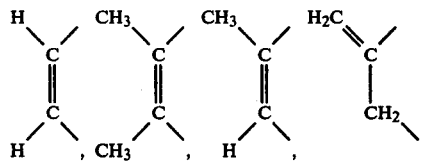

and a hydrazide of an amino acid of the general formula II

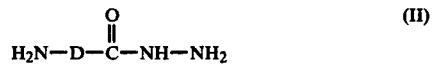

wherein D is a divalent organic group in a molar ratio of moles of N,N'-bisimide (I) to moles of aminobenzoic acid hydrazide (II) of between 1:1 and 10.

4. The preimpregnated fibrous structural material of claim 1 wherein the bisimide is 4,4'-bismaleimidodiphenylmethane and the amino acid hydrazide is m-aminobenzoic acid hydrazide.

5. A process for the production of preimpregnated fibrous structural materials from duromeric polyimide resins comprising impregnating a preoriented fibrous material selected from the group consisting of carbon, glass and aromatic polyamides in the form of unidirectional mats or fabrics with a resin solution comprising an aromatic hydrocarbon solvent selected from the group consisting of toluene, xylene, cyclic esters, ethers, cyclic ethers and mixtures thereof and said resin is a heat curable imide resin produced by reaction between an N,N'-bisimide of an unsaturated dicarboxylic acid of the general formula I

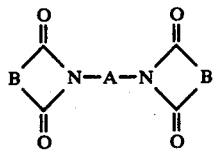

(I)

wherein A is a divalent organic group having at least two carbon atoms and B is a divalent organic group selected from the group consisting of 6. The process of claim 5 for preimpregnated fibrous materials wherein the solvent for the polyimide resin is selected from the group consisting of acetic acid ester, ethyl acetate, tetrahydrofuran, dioxane, ethylene glycol, diethylether, ethylene glycol dimethyl ether, diethylene glycol diethylether, diethylene glycol dimethylether, diethylene glycol monoethylether, diethyleneglycol-monomethylether and mixtures thereof, and aromatic hydrocarbons selected from the group consisting of benzene, toluene, xylene, and ketone solvents selected from the group consisting of acetone and methyl ethyl ketone.

7. The process of claim 5 wherein the bisimide is a eutectic mixture of 4,4'-bismaleimidodiphenylmethane and 2,4-bismaleimido-toluene and the solvent is a 1:1 mixture of dioxane and diethylene glycolmonoethylether.

* * * * *